United States Patent
Makino (10) Patent No.: US 6,222,590 B1
(45) Date of Patent: Apr. 24, 2001

(54) PHASE-LOCKED LOOP CIRCUIT

(75) Inventor: Yuji Makino, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/141,719

(22) Filed: Aug. 27, 1998

(30) Foreign Application Priority Data

Aug. 28, 1997 (JP) ................................................ 9-232857

(51) Int. Cl.$^7$ .............................. H04N 5/10; H03L 7/00
(52) U.S. Cl. ...................... 348/547; 348/548; 348/536; 331/20
(58) Field of Search ................................... 348/540, 541, 348/542, 543, 544, 545, 546, 547, 548, 536, 537, 525, 529, 530, 531; 331/11, 20, 1 R; H04N 5/10

(56) References Cited

U.S. PATENT DOCUMENTS

| | | | |
|---|---|---|---|
| 4,253,116 | 2/1981 | Rodgers, III | 358/149 |
| 4,679,005 | * 7/1987 | Tatami | 331/16 |
| 5,019,907 | 5/1991 | Murakoshi et al. | 358/158 |
| 5,189,515 | 2/1993 | Chen | 358/157 |
| 5,298,998 | * 3/1994 | Furumiya et al. | 348/537 |
| 5,347,365 | * 9/1994 | Harigai et al. | 348/525 |
| 5,912,713 | * 6/1999 | Tsunoda et al. | 348/540 |

FOREIGN PATENT DOCUMENTS 781038   6/1997   (EP) .

OTHER PUBLICATIONS

Patent Abstracts of Japan, "Synchronizing Circuit for Picture Signal", vol. 14:218 (E–0925), 5/90, (Mitsubishi Electric Corp., Abstract.

* cited by examiner

*Primary Examiner*—Michael Lee
(74) *Attorney, Agent, or Firm*—Foley & Lardner

(57) ABSTRACT

In a phase-locked loop circuit, a vertical synchronous separation circuit separates a vertical sync signal from a composite synchronizing signal to detect part of a vertical synchronizing period. A mask circuit masks the composite synchronizing signal during a predetermined period. A selector selects a reference signal or the composite synchronizing signal in accordance with the detection output from the vertical synchronous separation circuit. A phase comparator detects a phase difference between the output from the selector and the reference signal. A voltage-controlled oscillator changes an oscillation frequency upon receiving the output from the phase comparator through a low-pass filter. A counter counts the oscillation output from the voltage-controlled oscillator. A decoder circuit decodes the output from the counter to generate the reference signal, supplies it to the selector and the phase comparator, and resets the counter at a predetermined period. A mask pulse decoder generates a mask pulse to control a mask period of the mask circuit. The composite synchronizing signal is replaced with the reference signal in accordance with the detection output from the vertical synchronous separation circuit and supplied to an input of the phase comparator.

3 Claims, 9 Drawing Sheets

FIG.12

PHASE-LOCKED LOOP CIRCUIT

BACKGROUND OF THE INVENTION

1. Field of the Invention

The present invention relates to a phase-locked loop circuit for obtaining a new synchronizing signal on the basis of a video synchronizing signal externally supplied to a video display device and, more particularly, to a phase-locked loop circuit (to be referred to as a PLL circuit hereinafter) in a video display device such as a computer.

2. Description of the Prior Art

Conventionally, in deflection processing of a video display device for processing a video signal, a synchronizing signal is used as a reference timing for deflection. However, even in use of the synchronizing signal, no perfect synchronous screen can be obtained as far as only the frequencies are made to match by automatic frequency control, and the phases also need be locked.

For this purpose, a PLL circuit for obtaining a new synchronizing signal in correspondence with an input video synchronizing signal is used. By using the PLL circuit, the operation of the video display device is synchronized with the video signal, thereby realizing a perfect synchronous screen. Such a technique is disclosed in, e.g., FIG. 4 of Japanese Unexamined Patent Publication No. 5-90957.

Figure 1:
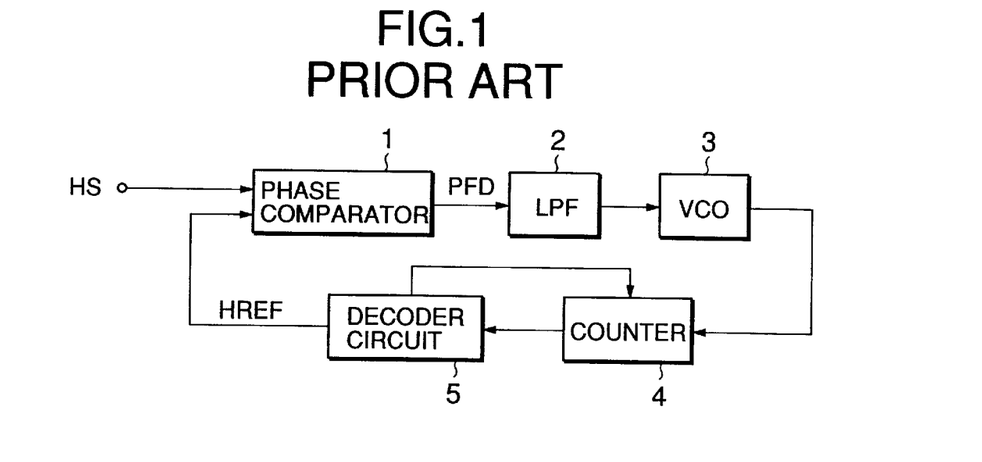
FIG. 1 is a block diagram showing the schematic arrangement of a PLL circuit according to the first prior art.

FIG. 1 is a block diagram showing the arrangement of a conventional PLL circuit. As shown in FIG. 1, the conventional PLL circuit has a phase comparator 1 having two input terminals to compare the phase of an input signal with that of a reference signal. A horizontal sync input signal HS for horizontal scanning is supplied to one input terminal of the phase comparator 1 and compared with a reference signal HREF supplied to the other input terminal. The phase comparator 1 outputs an output signal PFD. The output signal PFD from the phase comparator 1 is supplied to the control input terminal of a voltage-controlled oscillator (VCO) 3 through a low-pass filter (LPF) 2. The oscillation outputs from the VCO 3 are counted by a counter 4. The count value is supplied to a decoder circuit 5. The counter 4 and the decoder circuit 5 are used to count the oscillation outputs from the VCO 3 and set the reference signal HREF having the period (to be referred to as a horizontal period hereinafter) of the above-described horizontal sync input signal HS. The decoder circuit 5 resets the counter 4 when the count value of the counter 4 equals a predetermined value corresponding to the horizontal period.

That is, the counter 4 operates at the horizontal period, and the reference signal HREF having the horizontal period is output from the decoder circuit 5. The reference signal HREF having the horizontal period is supplied to the other input terminal of the phase comparator 1, and its phase is compared with that of the horizontal sync input signal HS. The output signal PFD output from the phase comparator 1 as an error voltage is supplied to the VCO 3 through the LPF 2. By controlling the oscillation frequency of the VCO 3, automatic frequency control for the horizontal sync input signal HS is performed.

This PLL circuit changes the oscillation frequency of the VCO 3 such that the phase difference between the horizontal sync input signal HS and the reference signal HREF having the horizontal period is minimized, so the reference signal HREF is synchronized with the horizontal sync input signal HS. In this state, the PLL circuit is locked, and stable phase control is performed.

Figure 2:
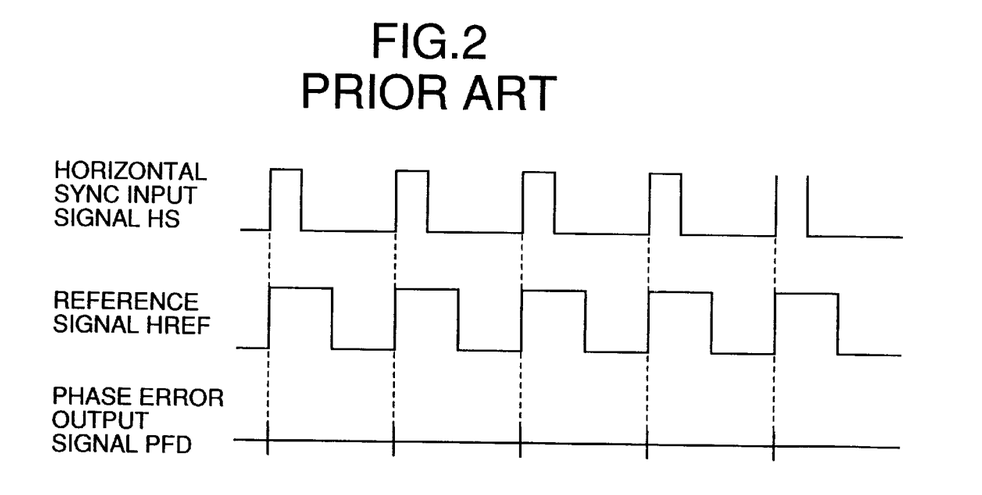
FIG. 2 is an input/output timing chart of a phase comparator shown in FIG. 1.

FIG. 2 is an input/output timing chart of the phase comparator shown in FIG. 1. As shown in FIG. 2, when the PLL circuit is locked, and a continuous horizontal sync input signal HS is input as an input signal, the phase comparator 1 outputs no phase difference from the reference signal HREF and fixed in a high-impedance state. Therefore, the PLL circuit continues a stable operation.

However, for the synchronizing signal externally input to the video display device, the horizontal sync signal HS and the vertical sync signal are not always completely separated. A composite sync signal in which the horizontal sync signal HS is superposed on the vertical sync signal may be input as an input signal.

Figure 3:
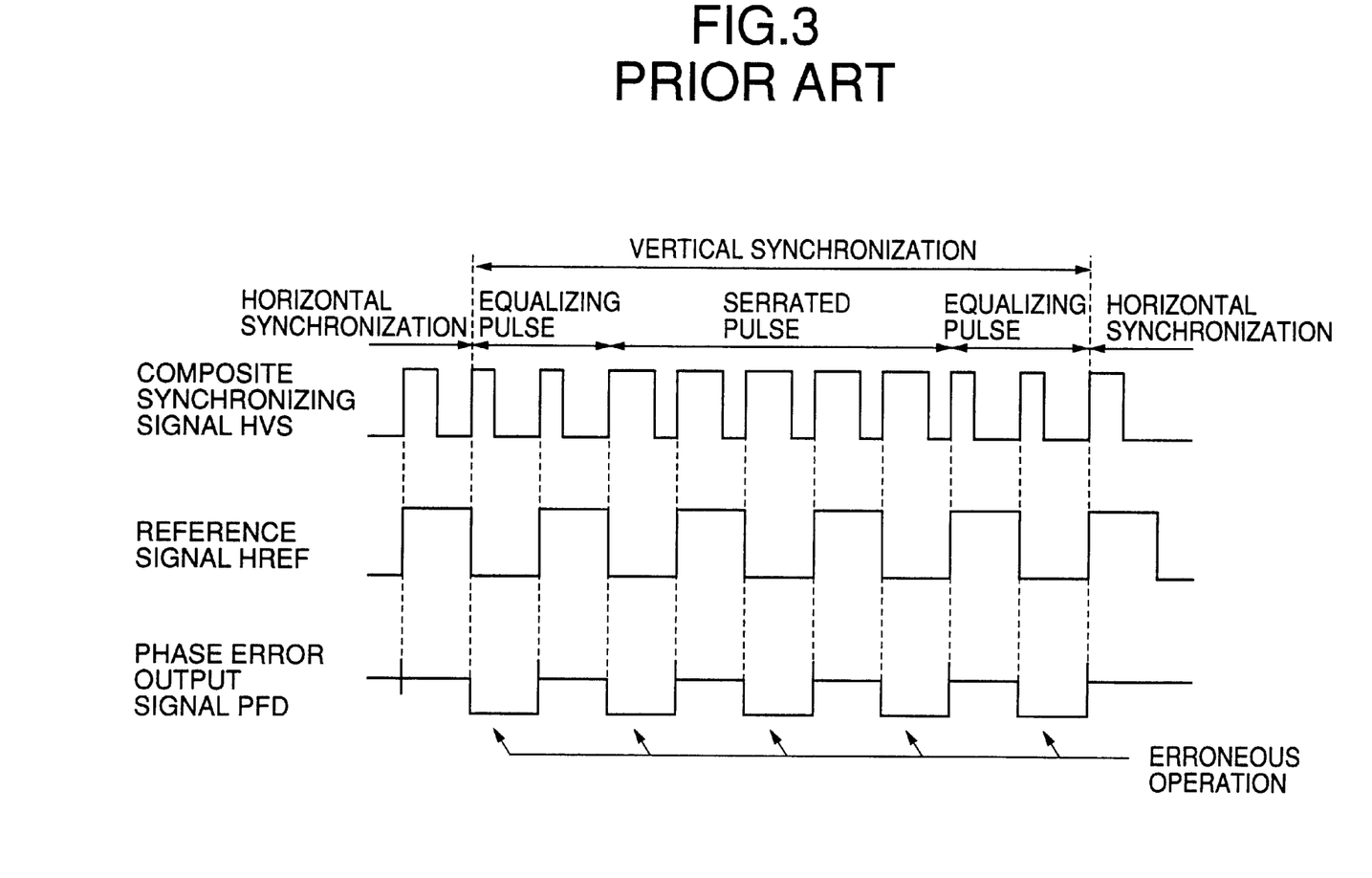
FIG. 3 is an input/output timing chart when a composite signal is input to the phase comparator shown in FIG. 1.

FIG. 3 is an input/output timing chart when a composite sync signal is input to the phase comparator shown in FIG. 1. As shown in FIG. 3, when a discontinuous synchronizing signal, i.e., a composite synchronizing signal HVS is input as an input synchronizing signal, the PLL circuit may erroneously operate.

The synchronizing signal at the horizontal scanning period is input to the PLL circuit without removing vertical sync signal components containing an equalizing pulse or a serrated pulse. For this reason, during a period when a vertical sync signal is input, the output PFD from the phase comparator 1 of the PLL circuit changes, and accordingly, the oscillation frequency of the VCO 3 also changes, and the locked state of the PLL circuit is canceled. As a result, the discontinuous composite synchronizing signal HVS causes an erroneous operation of the PLL circuit for receiving the horizontal sync component of the video signal.

As a general means for preventing the erroneous operation of the PLL circuit, the input signal to be supplied to the phase comparator 1 is replaced with another signal having the same period during a time interval when superposition of the vertical sync signal will pose a problem. A PLL circuit which replaces the input synchronizing signal with another signal having the same period to prevent the erroneous operation of the phase comparator 1, and the operation of the PLL circuit will be described below with reference to FIGS. 4 and 5.

Figure 4:
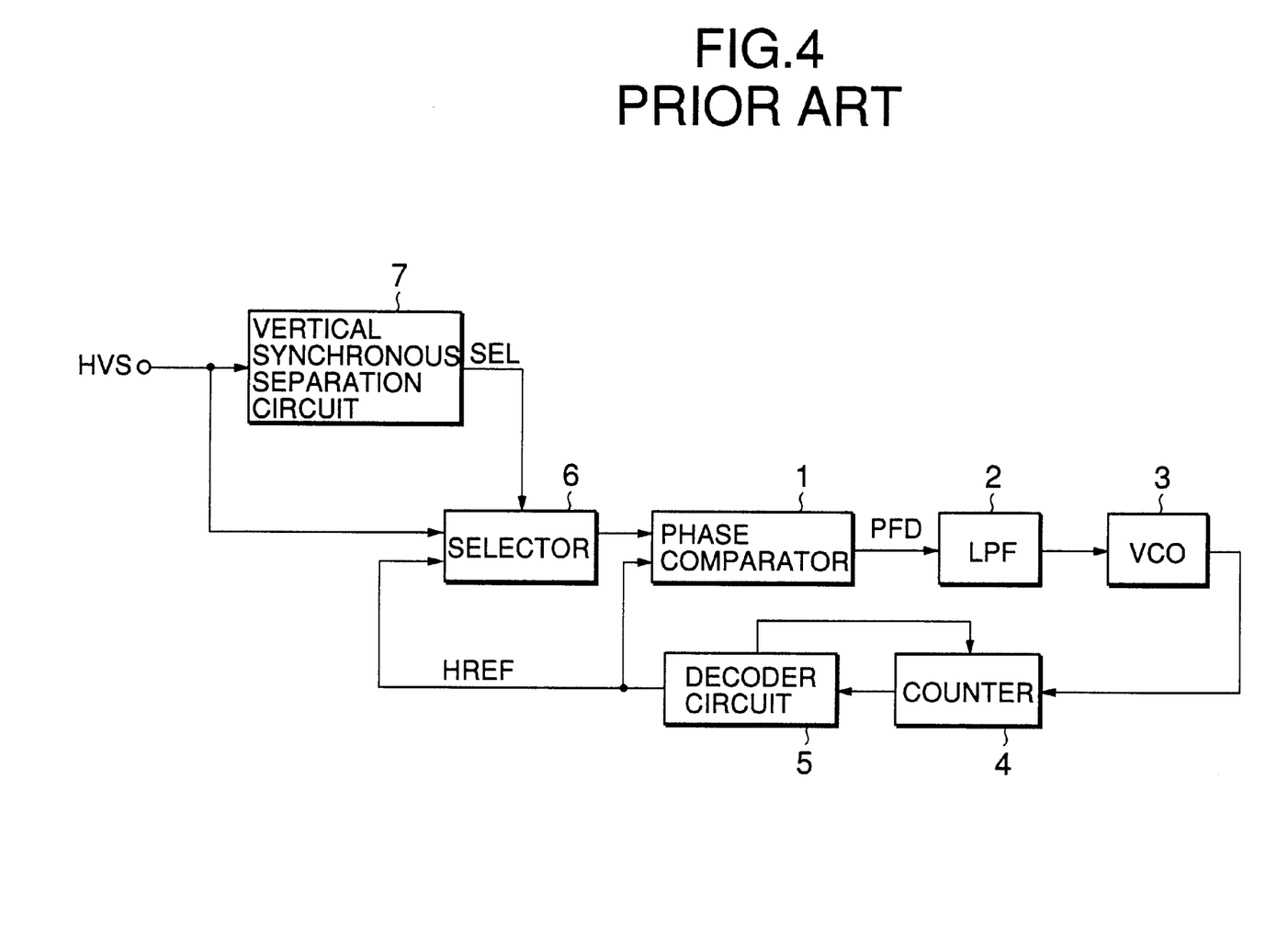
FIG. 4 is a block diagram showing the schematic arrangement of a PLL circuit according to the second prior art.
Figure 5:
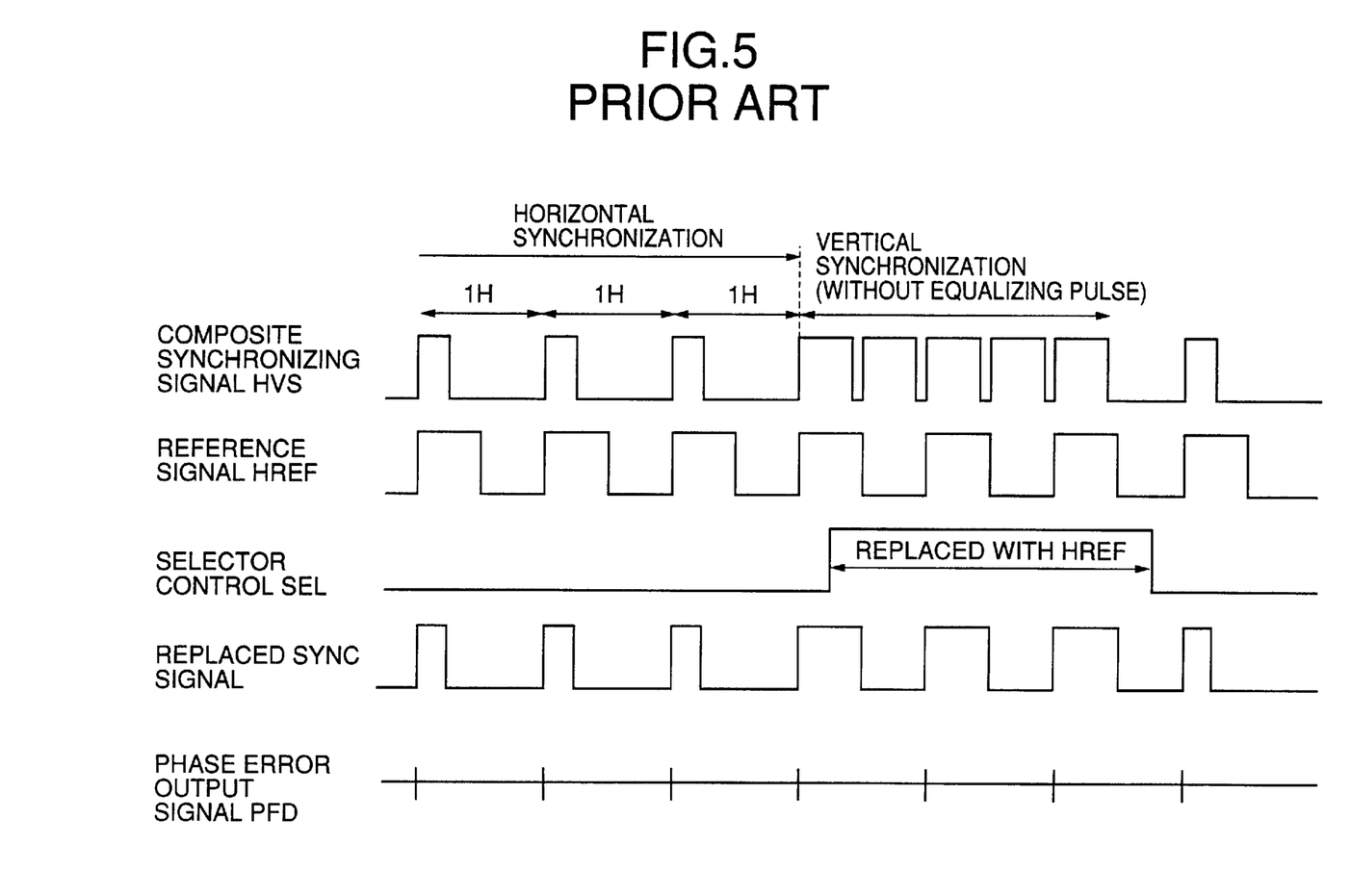
FIG. 5 is a timing chart of signals to explain the operation of a phase comparator shown in FIG. 4.

FIG. 4 is a block diagram showing a PLL circuit of another prior art. FIG. 5 is a timing chart showing signals so as to explain the normal operation of a phase comparator shown in FIG. 4. The same reference numerals and symbols as in the prior art shown in FIG. 1 denote the same circuits and signals in FIG. 4, and a detailed description thereof will be omitted.

As shown in FIGS. 4 and 5, for this PLL circuit, a vertical synchronous separation circuit 7 and a selector 6 are added to the circuit shown in FIG. 1. Especially, the selector 6 is arranged, on the input side of a phase comparator 1 for receiving an input synchronizing signal, to select a composite synchronizing signal HVS or a reference signal HREF in accordance with a selection pulse SEL obtained by separating the vertical sync component from the composite synchronizing signal HVS by the vertical synchronous separation circuit 7. The selector 6 replaces the composite synchronizing signal HVS as an input signal with the reference signal HREF during a period designated by the selection pulse SEL. More specifically, in the vertical synchronizing period when a phase error occurs due to input of the vertical sync component of the composite synchronizing signal HVS, the reference signal HREF is input to both terminals of the phase comparator 1, so the output side of the phase comparator 1 is kept fixed in the high-impedance state. That is, since no phase error output PFD is output, the output from a VCO 3 is prevented from changing such that the locked state of the PLL circuit is not canceled.

In this manner, the composite synchronizing signal HVS is replaced with the reference signal HREF and input to the phase comparator 1. In this case, in progressive scanning as one of image scanning schema, i.e., when one-horizontal (1H) interval is inserted between a horizontal sync signal component and a vertical sync signal component of the composite synchronizing signal HVS, and no equalizing pulse component is input, the phase comparator 1 can normally operate.

However, in interlaced scanning, i.e., when only a ½ horizontal (½ H) interval is set between a horizontal sync signal component and a vertical sync signal component, or when an equalizing pulse component is input, the erroneous operation of the phase comparator 1 during the vertical synchronizing period cannot be completely prevented only by replacing the composite synchronizing signal HVS with the reference signal HREF.

Figure 6:
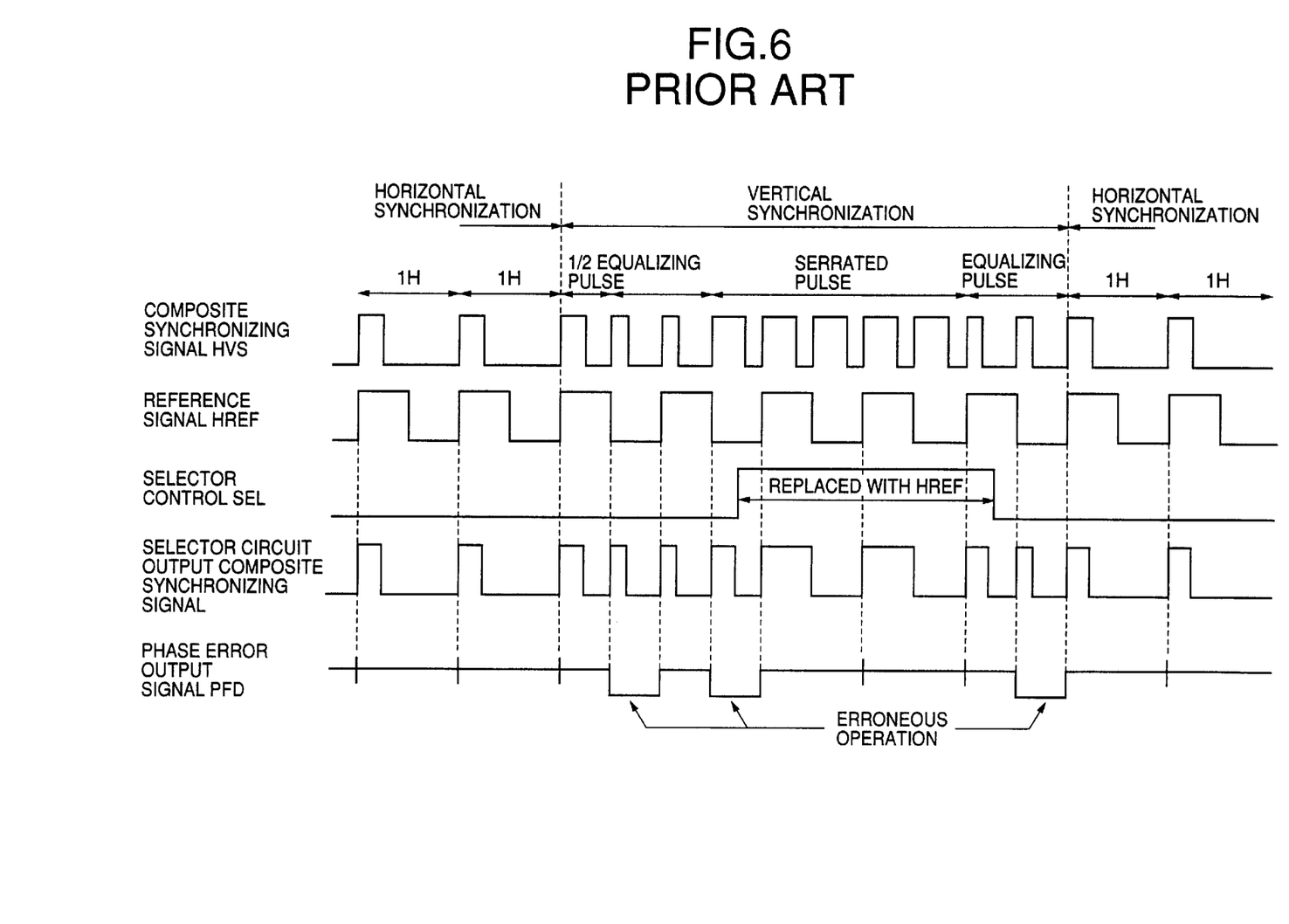
FIG. 6 is a timing chart of signals to explain an erroneous operation of the phase comparator shown in FIG. 4.

FIG. 6 is a timing chart showing signals so as to explain the erroneous operation of the phase comparator shown in FIG. 4. As shown in FIG. 6, a horizontal sync signal and a vertical sync signal of the composite synchronizing signal HVS are separated at an interval corresponding to only ½ horizontal period (½ H), and an equalizing pulse component is input. In this case, the vertical sync signal component of the composite synchronizing signal HVS is input at the ½ horizontal period (½ H). In addition, the composite synchronizing signal HVS is replaced with the reference signal HREF after input of the vertical sync signal component. For this reason, the phase comparator 1 outputs the phase error output PFD before and after the replacement, resulting in an erroneous operation.

In the above-described conventional PLL circuit, when the horizontal sync signal and the vertical sync signal are separated at only ½ horizontal period (½ H), as in interlaced scanning, or when an equalizing pulse component is inserted into the vertical sync signal, the erroneous operation of the phase comparator during the vertical synchronizing period cannot be completely prevented only by replacing the composite synchronizing signal HVS with the reference signal HREF. The reason has been described above. The vertical sync signal component of the composite synchronizing signal HVS is input at the ½ horizontal period (½ H), and replacement with the reference signal HREF is performed after input of the vertical sync signal component. For these reasons, during this period, phase locking to the reference signal HREF cannot be performed, and the phase error voltage is output from the phase comparator.

SUMMARY OF THE INVENTION

The present invention has been made in consideration of the above situation of the prior arts, and has as its object to provide a PLL circuit capable of preventing an erroneous operation of a phase comparator by preventing the phase comparator from receiving an equalizing pulse component or a vertical sync signal component of a composite synchronizing signal which is input at a ½ horizontal period, and also realizing a stable operation of the entire circuit.

According to the present invention, there is provided a phase-locked loop circuit for receiving a composite synchronizing signal containing a horizontal sync signal and a vertical sync signal and generating a signal synchronized with the composite synchronizing signal, comprising a vertical synchronous separation circuit for separating the vertical sync signal from the composite synchronizing signal to detect part of a vertical synchronizing period, a mask circuit for masking the composite synchronizing signal from an input terminal during a predetermined period, a selector for selecting one of a reference signal generated on the basis of the composite synchronizing signal and the composite synchronizing signal masked by the mask circuit in accordance with a detection output from the vertical synchronous separation circuit, a phase comparator for detecting a phase difference between an output from the selector and the reference signal, a voltage-controlled oscillator for changing an oscillation frequency upon receiving an output from the phase comparator through a low-pass filter, a counter for counting an oscillation output from the voltage-controlled oscillator, a decoder circuit for decoding an output from the counter to generate the reference signal, supplying the reference signal to the selector and the phase comparator, and resetting the counter at a predetermined period, and a mask pulse decoder for generating a mask pulse phase-shifted from the reference signal by a predetermined period, in accordance with the output from the counter to control a mask period of the mask circuit, wherein the composite synchronizing signal is replaced with the reference signal in accordance with the detection output from the vertical synchronous separation circuit and supplied to an input of the phase comparator.

The mask pulse decoder in the PLL circuit of the present invention comprises a set decoder and a reset decoder which receive the count output from the counter and generate a set pulse at a period ¼ a horizontal scanning period and a reset pulse at a period ¾ the horizontal scanning period, respectively, and latch means for latching outputs from the set decoder and the reset decoder and outputting the mask pulse.

The mask circuit in the PLL circuit of the present invention comprises a gate for receiving the mask pulse from the mask pulse decoder and inverting the mask pulse, and a logic element for ANDing the composite synchronizing input and an output from the gate, and sets the mask period of the composite synchronizing input.

The PLL circuit of the present invention having the above aspects has the mask circuit for masking the composite synchronizing signal and a mask pulse decoder for controlling the mask circuit on the basis of the count value from the counter for counting the oscillation output from the VCO. With this arrangement, even when a composite synchronizing signal is externally input, the phase comparator can continue the normal operation. Therefore, the entire circuit including the VCO for receiving the output from the phase comparator can stably operate. This is because the externally input composite synchronizing signal is processed and phase-locked to the reference signal, and the processed signal is supplied to the phase comparator as an input.

The above and many other object, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENT

Figure 7:
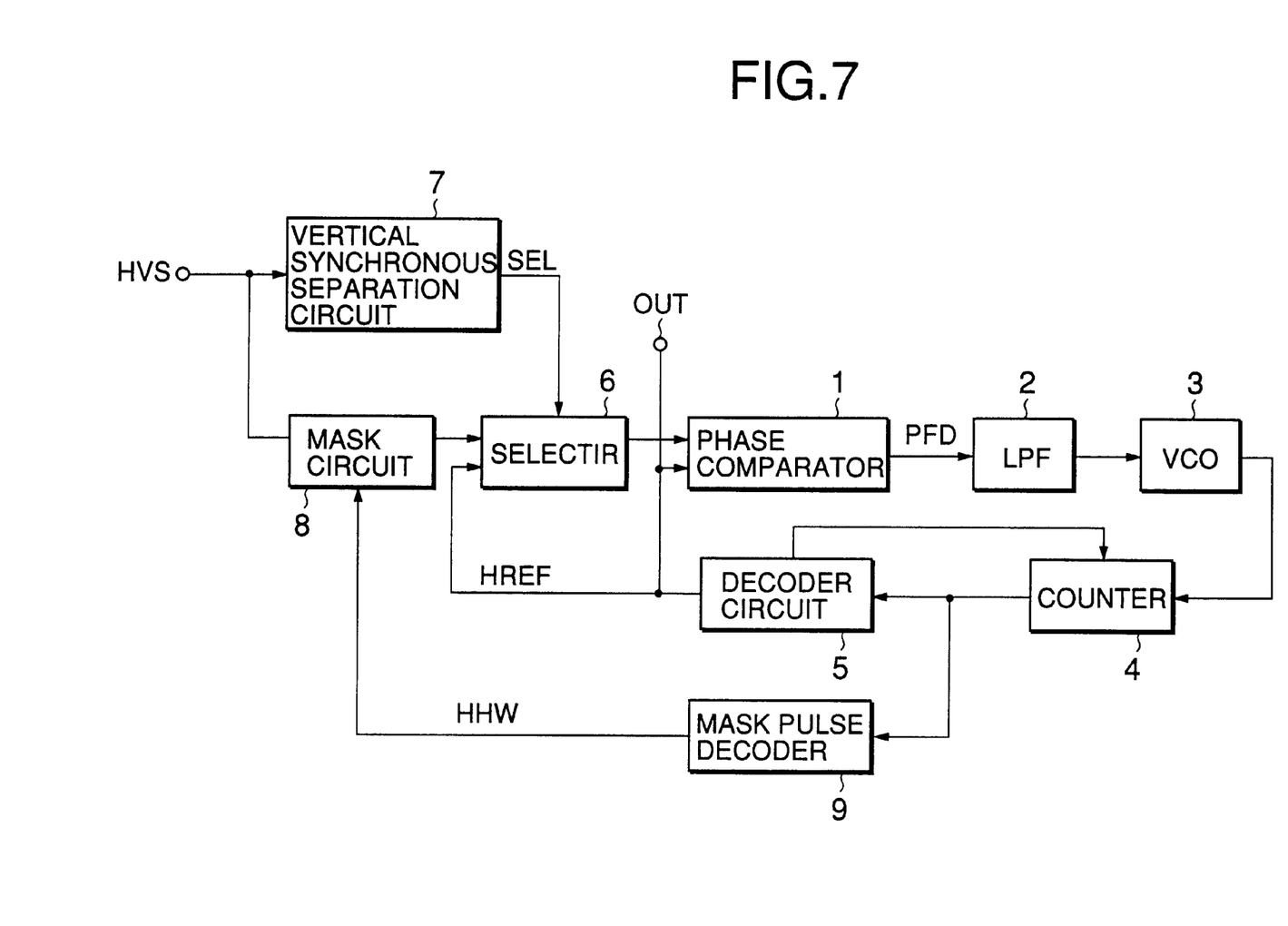
FIG. 7 is a block diagram showing the schematic arrangement of an embodiment of the present invention.

A preferred embodiment of the present invention will be described next with reference to the accompanying drawings. FIG. 7 is a block diagram of a PLL circuit according to the embodiment of the present invention. As shown in FIG. 7, in the PLL circuit of this embodiment, a mask circuit 8 and a mask pulse decoder 9 are added to the above-described conventional circuit shown in FIG. 4. The feedback system comprising a phase comparator 1, a low-pass filter (LPF) 2, a voltage-controlled oscillator (VCO) 3, a counter 4, and a decoder circuit 5, a vertical synchronous separation circuit 7, and a selector 6 are the same as in FIG. 4. An output PFD from the phase comparator 1 is input to the VCO 3 through the LPF 2. The oscillation output from the VCO 3 is frequency-divided and decoded by the decoder circuit 5 to obtain a reference signal HREF. The reference signal HREF is supplied to input terminals of the selector 6 and the phase comparator 1. In addition, input of a composite synchronizing signal HVS to the selector 6 is masked by the mask pulse decoder 9 and the mask circuit 8.

Especially, in this embodiment, the composite synchronizing signal HVS as an input signal containing a horizontal sync signal and a vertical sync signal is input to an input terminal of the phase comparator 1 while phase-locking the composite synchronizing signal HVS to the reference signal HREF during the vertical synchronizing period. More specifically, the mask circuit 8 receives the composite synchronizing signal HVS and masks the half H component and the equalizing pulse during the vertical synchronizing period. The selector 6 arranged on the output side of the mask circuit 8 replaces the signal during a serrated pulse period with the reference signal HREF. By replacing the signal, the input to the phase comparator 1 is converted into a signal capable of phase-locking to the reference signal HREF.

A mask pulse HHW used as a control signal for the mask circuit 8 is generated by the mask pulse decoder 9 upon receiving the count value from the counter 4. As the control signal SEL for the selector 6, a vertical sync signal component separated from the composite synchronizing signal HVS by the vertical synchronous separation circuit 7 is used.

Figure 8:
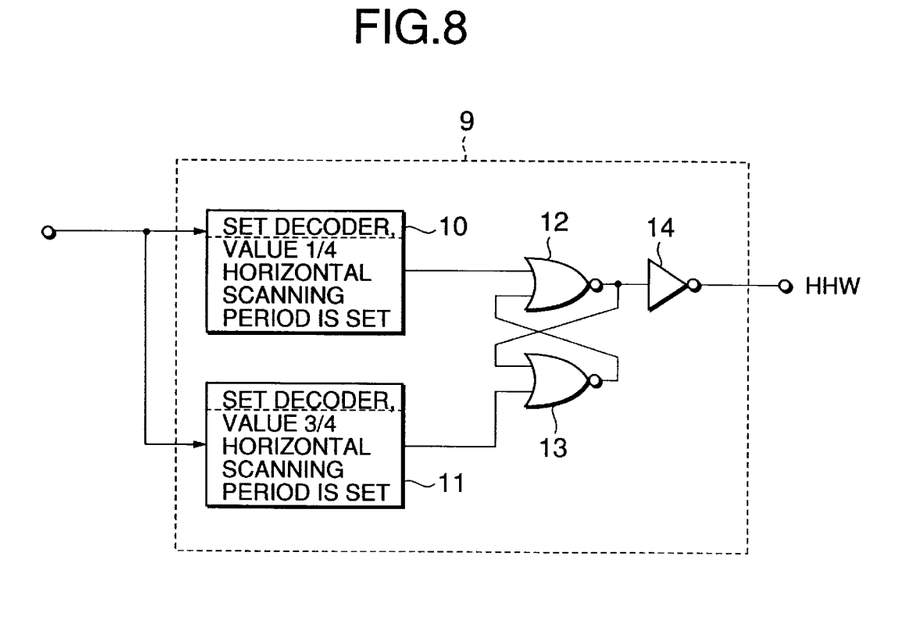
FIG. 8 is a circuit diagram of a mask pulse decoder shown in FIG. 7.
Figure 9:
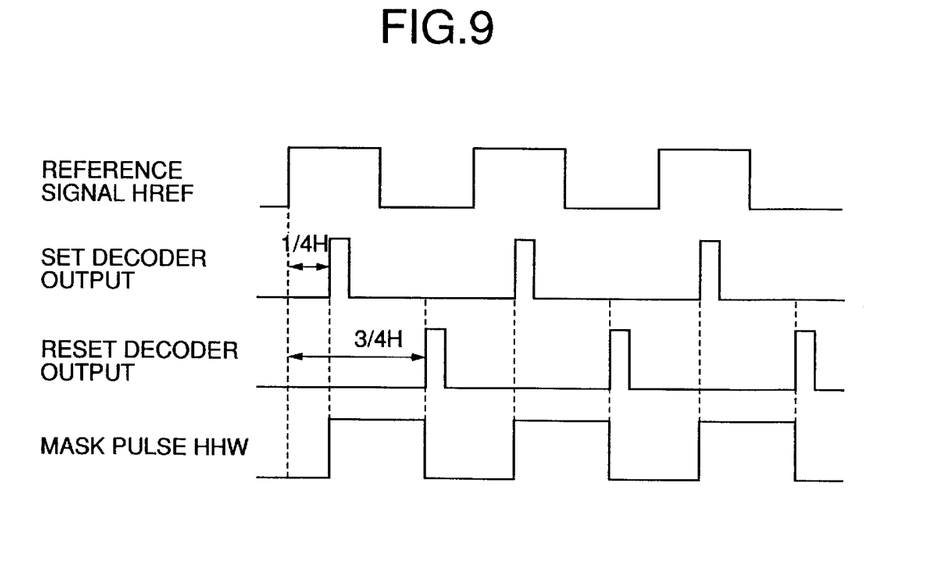
FIG. 9 is a timing chart of signals in the circuit shown in FIG. 8.

FIG. 8 is a circuit diagram of the mask pulse decoder shown in FIG. 7. FIG. 9 is a timing chart of signals shown in FIG. 8. As shown in FIGS. 8 and 9, the mask pulse decoder 9 comprises a set decoder 10 and a reset decoder 11 which receive the count value from the counter 4 and in which a value ¼ the horizontal scanning period and a value ¾ the horizontal scanning period are respectively set, NOR gates 12 and 13 as logic elements for receiving the outputs from the decoders 10 and 11, respectively, performing logical calculation, and outputting the mask pulse HHW, and an inverter 14.

The operation of the mask pulse decoder 9 will be described. When the count value from the counter 4 is input to the set decoder 10 and the reset decoder 11, the set decoder 10 outputs a set pulse at a timing such that the count value corresponds to ¼ the horizontal period while the reset decoder 11 outputs a reset pulse at a timing such that the count value corresponds to ¾ the horizontal period. The set pulse from the set decoder 10 and the reset pulse from the reset decoder 11 are input to a latch circuit formed from the logic gates 12 and 13.

When the set pulse is input to the latch circuit, the output HHW from the mask pulse decoder 9 is set at level "1" at a phase ¼ the horizontal period. When the reset pulse is input, the output HHW is set at level "0" at a phase ¾ the horizontal period. As a result, the decoded output HHW ¼-phase-shifted from the reference signal HREF is generated.

The signal HHW as the output from the mask pulse decoder 9 is input to the mask circuit 8 as a control signal. The mask circuit 8 masks the half H component of the composite synchronizing signal HVS and the equalizing pulse component in accordance with the signal HHW.

That is, the mask pulse HHW is a signal obtained by delaying the phase of the reference signal HREF by about ¼ period.

Figure 10:
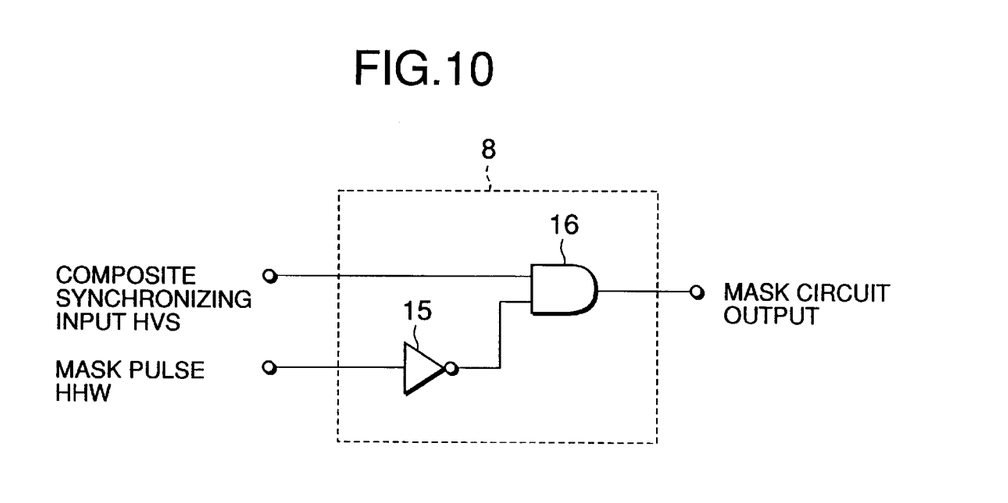
FIG. 10 is a circuit diagram showing the arrangement of a mask circuit shown in FIG. 7.
Figure 11:
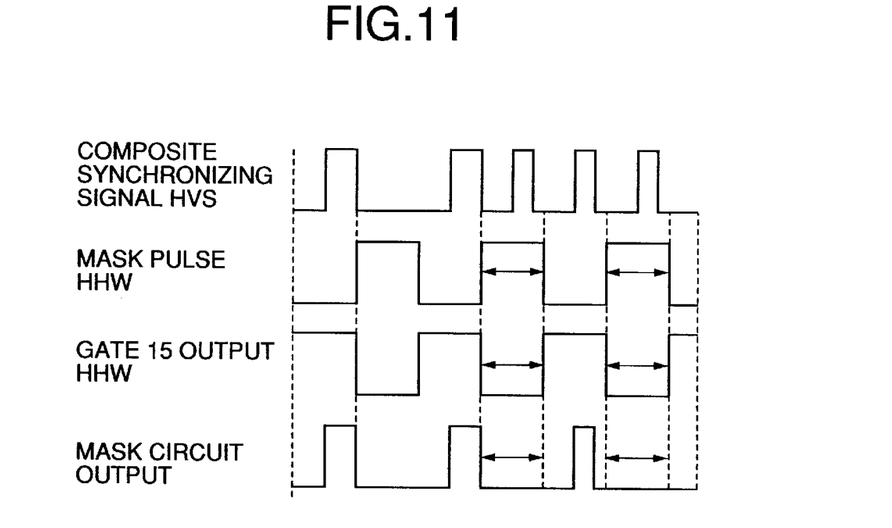
FIG. 11 is a timing chart of signals in the mask circuit shown in FIG. 10.

FIG. 10 is a circuit diagram of the mask circuit shown in FIG. 7. FIG. 11 is a timing chart of signals shown in FIG. 10. As shown in FIGS. 10 and 11, the mask circuit 8 comprises an inverter 15 for inverting the mask pulse HHW input as a control signal, and an AND gate 16 for ANDing the composite synchronizing signal HVS and the output from the inverter 15. The mask pulse HHW input to the mask circuit 8 is level-inverted by the inverter 15 and supplied to one input terminal of the AND gate 16. The composite synchronizing signal HVS is supplied to the other input terminal of the AND gate 16. Therefore, when the output from the inverter 15 is at level "0", the composite synchronizing signal HVS is forcibly masked, so the composite synchronizing output is set at level "0".

That is, the mask pulse decoder 9, the mask circuit 8, and the selector 6 control to select the composite synchronizing signal HVS or the reference signal HREF as an input signal, and the controlled signal is supplied to the phase comparator 1.

Figure 12:
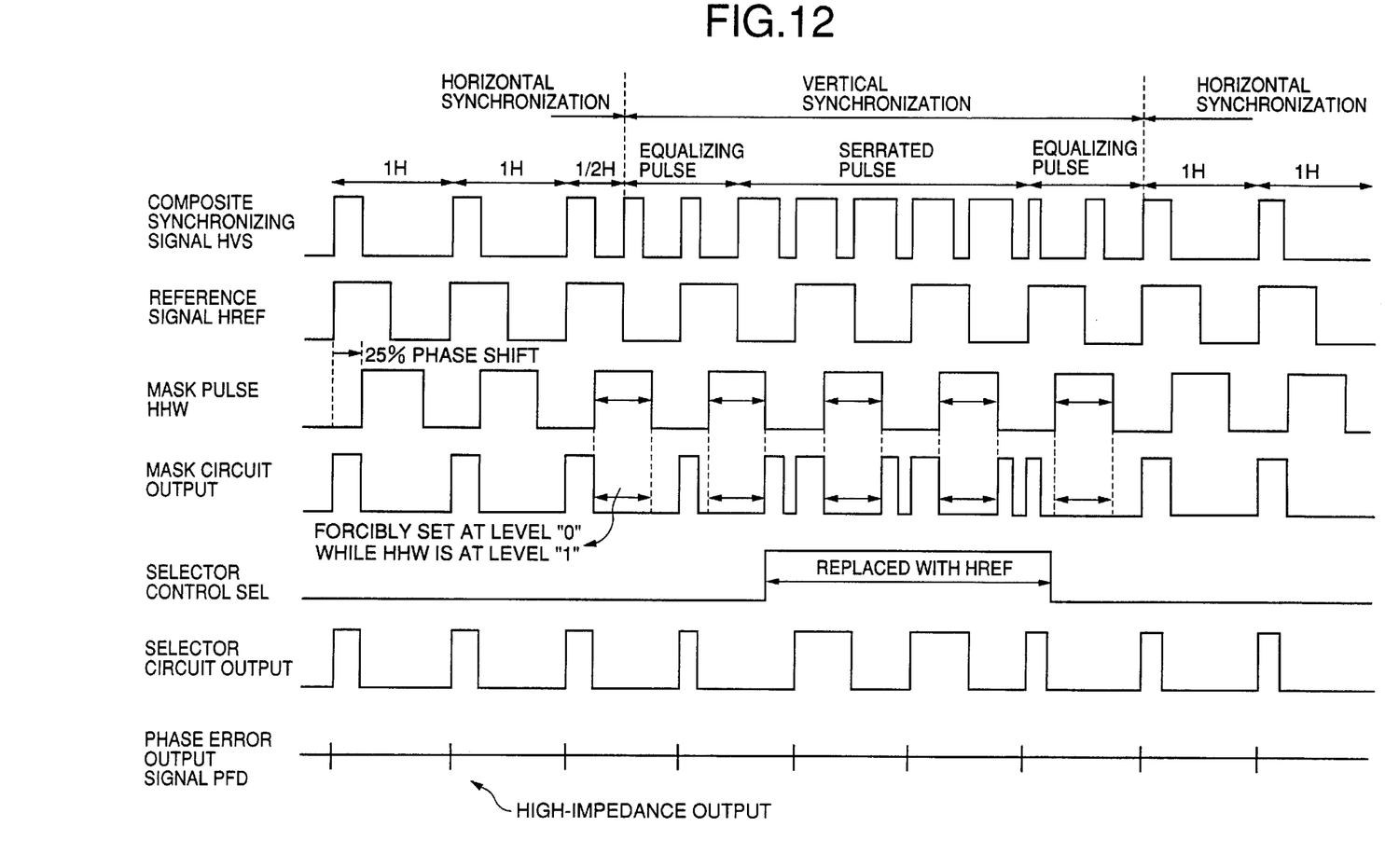
FIG. 12 is a timing chart of signals to explain the circuit operation in the embodiment shown in FIG. 7 in more detail.

FIG. 12 is a timing chart showing signals to explain the operation of the circuit shown in FIG. 7 in more detail. The entire circuit operation will be described. As shown in FIG. 12, when the reference signal HREF is output from the decoder circuit 5 in phase with the horizontal sync signal while the horizontal sync component of the composite synchronizing signal HVS is being input, the feedback system constituted by the phase comparator 1, the LPF 2, the VCO 3, the counter 4, and the decoder circuit 5 stable operates. Since the mask pulse HHW as the output from the mask pulse decoder 9 has a phase shift (lag) of 25% with respect to the reference signal HREF, the mask circuit 8 directly outputs the composite synchronizing signal HVS to the selector 6. The selector 6 directly outputs the composite synchronizing signal HVS without selecting the reference signal HREF because of the absence of the selector control signal SEL from the vertical synchronous separation circuit 7. As a result, the composite synchronizing signal HVS and the reference signal HREF are input to the phase comparator 1 in phase. The error output PFD represents a normal output, i.e., the high-impedance state.

As described above, the error output PFD from the phase comparator 1 becomes a high-impedance output, and therefore, the PLL circuit keeps the locked state.

When a vertical sync component of the composite synchronizing signal HVS is input, the composite synchronizing signal HVS is masked by the mask circuit 8 using the mask pulse HHW ¼-phase-shifted (25%-phase-shifted) from the reference signal HREF. When the mask pulse HHW is at level "1", the composite synchronizing signal HVS is forcibly masked, so a signal of level "0" is output from the mask circuit 8. With this operation, the half H component generated at the end of the horizontal sync component of the composite synchronizing signal HVS and the equalizing pulse components generated at the start and end of the vertical sync component of the composite synchronizing signal HVS are completely masked. More specifically, the vertical sync signal component of the composite synchronizing signal HVS, which is positioned at a phase corresponding to an odd multiple of the ½ horizontal period from the final horizontal sync signal of the composite synchronizing signal HVS is completely masked.

The composite synchronizing signal HVS which has undergone mask processing by the mask circuit 8 is supplied to an input terminal of the selector 6. Since the composite synchronizing signal HVS still has a serrated pulse component of the vertical sync signal, the selector 6 performs selection control processing of selecting the reference signal HREF or the composite synchronizing signal HVS for the serrated pulse component. When the selection pulse SEL is at level "1" because the vertical synchronous separation circuit 7 detects the serrated pulse period in the vertical sync component of the composite synchronizing signal HVS, the composite synchronizing signal HVS to the selector 6 is replaced with the reference signal HREF.

With this operation, the composite synchronizing signal HVS supplied to the phase comparator 1 as an input is in phase with the reference signal HREF. Therefore, the phase comparator 1 can continue the normal operation (high-impedance output) without performing any erroneous operation.

In the above-described embodiment, the half H component of the composite synchronizing signal as an input signal and an equalizing pulse component are masked. During the serrated pulse period, the composite synchronizing signal is replaced with the reference signal. With this arrangement, since a signal phase-locked to the reference signal is input to the phase comparator, the output from the phase comparator is prevented from an abrupt change.

What is claimed is:

1. A phase-locked loop circuit for receiving a composite synchronizing signal containing a horizontal sync signal and a vertical sync signal and generating a signal synchronized with the composite synchronizing signal, comprising:

a vertical synchronous separation circuit for separating the vertical sync signal from the composite synchronizing signal to detect part of a vertical synchronizing period;

a mask circuit for masking the composite synchronizing signal from an input terminal during a predetermined period;

a selector for selecting one of a reference signal generated on the basis of the composite synchronizing signal and the composite synchronizing signal masked by said mask circuit, in accordance with a detection output from said vertical synchronous separation circuit;

a phase comparator for detecting a phase difference between an output from said selector and the reference signal;

a voltage-controlled oscillator for changing an oscillation frequency upon receiving an output from said phase comparator through a low-pass filter;

a counter for counting an oscillation output from said voltage-controlled oscillator;

a decoder circuit for decoding an output from said counter to generate the reference signal, supplying the reference signal to said selector and said phase comparator, and resetting said counter at a predetermined period; and a mask pulse decoder for generating a mask pulse phase-shifted from the reference signal by a predetermined period in accordance with the output from said counter to control a mask period of said mask circuit, wherein the composite synchronizing signal is replaced with the reference signal in accordance with the detection output from said vertical synchronous separation circuit and supplied to an input of said phase comparator.

2. A circuit according to claim 1, wherein said mask pulse decoder comprises a set decoder and a reset decoder which receive the count output from said counter and generate a set pulse at a period ¼ a horizontal scanning period and a reset pulse at a period ¾ the horizontal scanning period, respectively, and latch means for latching outputs from said set decoder and said reset decoder and outputting the mask pulse.

3. A circuit according to claim 1, wherein said mask circuit comprises a gate for receiving the mask pulse from said mask pulse decoder and inverting the mask pulse, and a logic element for ANDing the composite synchronizing input and an output from said gate, and sets the mask period of the composite synchronizing input.

* * * * *